United States Patent
Tzabari

(10) Patent No.: US 12,221,204 B2
(45) Date of Patent: Feb. 11, 2025

(54) SYSTEM AND METHOD FOR ACTUATING HIGH-LIFT FLIGHT CONTROL SURFACES

(71) Applicant: BOMBARDIER INC., Dorval (CA)

(72) Inventor: Ehud Tzabari, St-Laurent (CA)

(73) Assignee: BOMBARDIER INC., Dorval (CA)

( * ) Notice: Subject to any disclaimer, the term of this patent is extended or adjusted under 35 U.S.C. 154(b) by 13 days.

(21) Appl. No.: 16/765,591

(22) PCT Filed: Nov. 19, 2018

(86) PCT No.: PCT/CA2018/051467
§ 371 (c)(1),
(2) Date: May 20, 2020

(87) PCT Pub. No.: WO2019/100149
PCT Pub. Date: May 31, 2019

(65) Prior Publication Data
US 2020/0307775 A1    Oct. 1, 2020

Related U.S. Application Data

(60) Provisional application No. 62/589,079, filed on Nov. 21, 2017.

(51) Int. Cl.
*B64C 13/28* (2006.01)
*B64C 13/02* (2006.01)
*B64C 13/38* (2006.01)

(52) U.S. Cl.
CPC .............. *B64C 13/38* (2013.01); *B64C 13/02* (2013.01); *B64C 13/341* (2018.01)

(58) Field of Classification Search
CPC ........... B64C 13/26; B64C 13/28; B64C 9/16; B64C 9/18; B64C 9/20; F16D 2500/7049; F16D 2066/005
See application file for complete search history.

(56) References Cited

U.S. PATENT DOCUMENTS

| | | | |
|---|---|---|---|
| 4,441,675 | A | 4/1984 | Boehringer et al. |
| 5,743,490 | A | 4/1998 | Gillingham et al. |

(Continued)

OTHER PUBLICATIONS

Patent Cooperation Treaty, International Search Report and Written Opinion re: International Application No. PCT/CA2018/051467, Jan. 22, 2019.

*Primary Examiner* — Nicholas McFall
*Assistant Examiner* — Terri L Filosi
(74) *Attorney, Agent, or Firm* — Norton Rose Fulbright Canada LLP

(57) ABSTRACT

A system and method for actuating one or more high-lift flight control surfaces of an aircraft are disclosed. The system comprises actuators operatively coupled between a driveline and one or more high-lift flight control surfaces associated with a wing of the aircraft. The actuators are configured to cause actuation of the one or more first high-lift flight control surfaces in response to being driven by the first driveline. Each actuator is associated with a no-back device configured to prevent an air load on the one or more high-lift flight control surfaces from driving the one or more high-lift flight control surfaces. The system also comprises a backup brake applicable to the driveline. The backup brake can be applied upon the identification of a developing unsafe condition such as an asymmetry condition between the flight control surfaces of each wing of the aircraft or an uncommanded movement the flight control surfaces.

14 Claims, 3 Drawing Sheets

(56) References Cited

U.S. PATENT DOCUMENTS

| 6,076,767 | A | 6/2000 | Farley et al. |
| 6,824,099 | B1 | 11/2004 | Jones |
| 9,190,942 | B2 | 11/2015 | Polcuch |
| 2005/0151027 | A1 | 7/2005 | Recksiek et al. |
| 2013/0181089 | A1* | 7/2013 | Recksiek ............ B64C 9/16 244/99.3 |
| 2014/0138480 | A1 | 5/2014 | Richter |
| 2014/0343784 | A1 | 11/2014 | Brady et al. |

\* cited by examiner

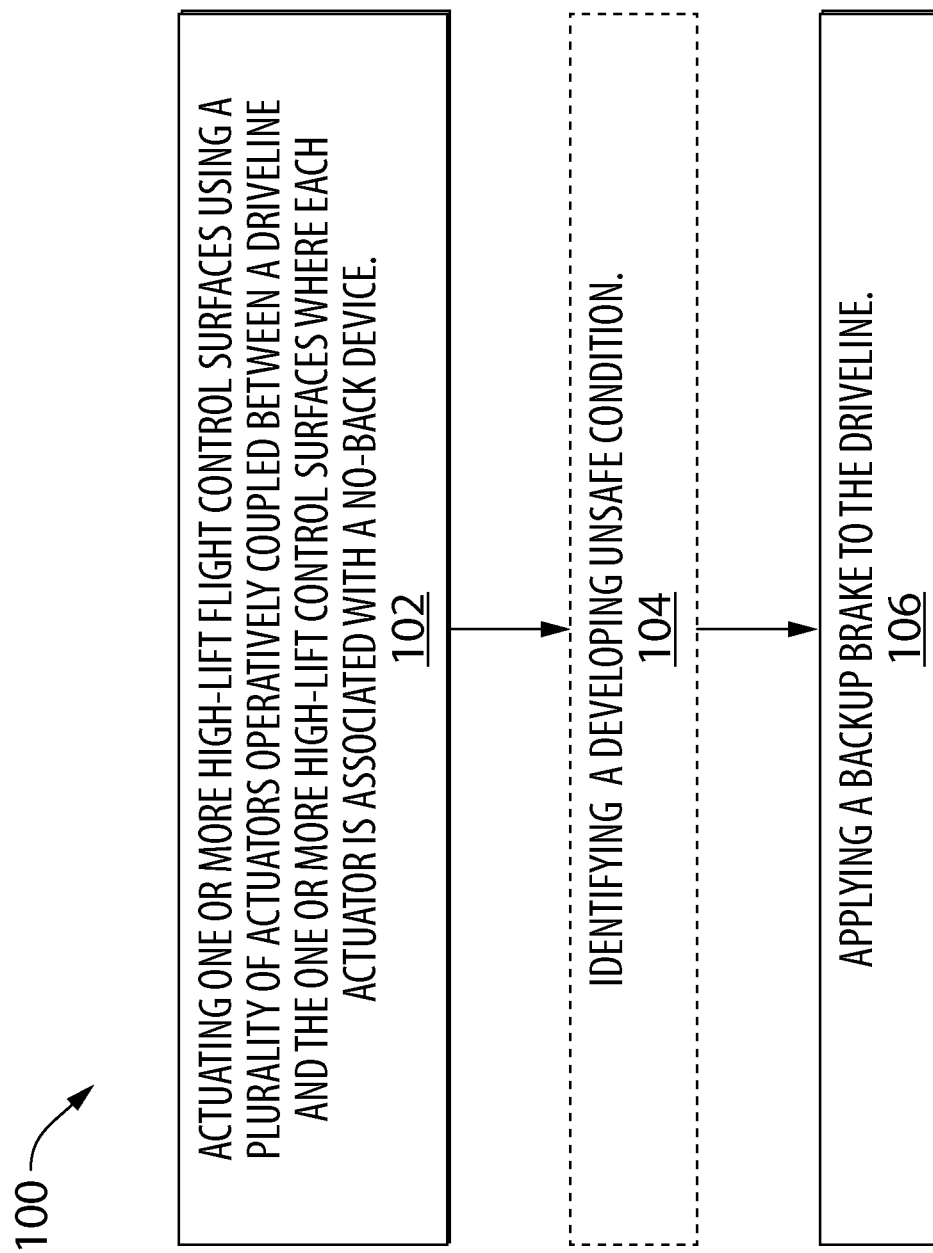

SYSTEM AND METHOD FOR ACTUATING HIGH-LIFT FLIGHT CONTROL SURFACES

CROSS-REFERENCE TO RELATED APPLICATION(S)

This application is a national phase application under 35 U.S.C. 371 of International Patent Application No. PCT/CA2018/051467 filed on Nov. 19, 2018, which claims priority from U.S. Provisional Patent Application Ser. No. 62/589,079 filed on Nov. 21, 2017, the entire content of which is incorporated herein by reference.

TECHNICAL FIELD

The disclosure relates generally to aircraft, and more particularly to high-lift flight control surfaces of aircraft.

BACKGROUND

Aircraft wings often include movable high-lift flight control surfaces such as trailing edge flaps and leading edge slats that can be selectively deployed or retracted using an actuation system. High-lift systems may be synchronized mechanically between left and right wing actuators using an interconnecting driveline between actuators. Since the high-lift flight control surfaces significantly alter the lift producing characteristics of the wings, it is important for safe operation of the aircraft that the actuation system also includes safeguards for detecting and reacting to potential malfunctions before they develop to an unsafe condition. For example, a situation in which the position of the flaps or slats on one wing would lose synchronization with the counterpart flaps or slats on the other wing of the aircraft (i.e., a condition known as asymmetry) could potentially create controllability problems for the aircraft.

SUMMARY

In one aspect, the disclosure describes a system for actuating one or more high-lift flight control surfaces of an aircraft. The system comprises:
a first driveline;
a plurality of first actuators operatively coupled between the first driveline and one or more first high-lift flight control surfaces associated with a first wing of the aircraft, and configured to cause actuation of the one or more first high-lift flight control surfaces in response to being driven by the first driveline, each first actuator being associated with a respective first no-back device configured to prevent an air load on the one or more first high-lift flight control surfaces from driving the one or more first high-lift flight control surfaces; and
a first backup brake applicable to the first driveline.

The first backup brake may be configured to counteract a first back-driving force applicable to the first driveline by no more than one of the first actuators.

The first backup brake may be configured to produce a first maximum braking force that is lower than a maximum total back-driving force applicable to the first driveline by all of the first actuators in combination.

The first backup brake may be configured to produce a first maximum braking force that is lower than a maximum driving force applicable to the first driveline by a power drive unit coupled to the first driveline.

The system may comprise:
a second driveline;
a plurality of second actuators operatively coupled between the second driveline and one or more second high-lift flight control surfaces associated with a second wing of the aircraft, and configured to cause actuation of the one or more second high-lift flight control surfaces in response to being driven by the second driveline, each second actuator being associated with a respective second no-back device configured to prevent an air load on the one or more second high-lift flight control surfaces from driving the one or more second high-lift flight control surfaces; and
a second backup brake applicable to the second driveline.

The second backup brake may be configured to counteract a second back-driving force applicable to the second driveline by no more than one of the second actuators.

The second backup brake may be configured to produce a second maximum braking force that is lower than a maximum total back-driving force applicable to the second driveline by all of the second actuators in combination.

The second backup brake may be configured to produce a maximum second braking force that is lower than a maximum second driving force applicable to the driveline.

The system may comprise:
a first sensor configured to sense a first parameter associated with the one or more first high-lift flight control surfaces;
a second sensor configured to sense a second parameter associated with the one or more second high-lift flight control surfaces; and
a controller operatively coupled to the first and second sensors and to the first and second backup brakes, and configured to:
identify a developing unsafe condition based on the first and second parameters sensed by the first and second sensors; and
cause an application of one or both of the first and second backup brakes after the identification of the unsafe condition.

The developing unsafe condition may be an uncommanded movement of the first or second high-lift flight control surfaces.

The developing unsafe condition may be a developing asymmetry condition between the first and second high-lift flight control surfaces.

The first backup brake may be disposed outboard of a majority of the first actuators, and the second backup brake may be disposed outboard of a majority of the second actuators.

Embodiments can include combinations of the above features.

In another aspect, the disclosure describes a method for actuating one or more high-lift flight control surfaces of an aircraft. The method comprises:
actuating one or more first high-lift flight control surfaces using a plurality of first actuators operatively coupled between a first driveline and the one or more first high-lift flight control surfaces, each first actuator being associated with a first no-back device configured to prevent an air load on the one or more first high-lift flight control surfaces from driving the one or more first high-lift flight control surfaces; and
applying a first backup brake to the first driveline.

The first backup brake may be configured to counteract a first back-driving force applied to the first driveline by no more than one of the first actuators.

The first backup brake may be configured to produce a first maximum braking force that is lower than a maximum total back-driving force applicable to the first driveline by all of the first actuators in combination.

The first backup brake may be configured to produce a maximum first braking force that is lower than a maximum first driving force applicable to the driveline by a power drive unit.

The method may comprise:

actuating one or more second high-lift flight control surfaces using a plurality of second actuators operatively coupled between a second driveline and the one or more second high-lift flight control surfaces, each second actuator being associated with a second no-back device configured to prevent an air load on the one or more second high-lift flight control surfaces from driving the one or more second high-lift flight control surfaces; and applying a second backup brake to the second driveline.

The second backup brake may be configured to counteract a second back-driving force applied to the second driveline by no more than one of the second actuators.

The second backup brake may be configured to produce a second maximum braking force that is lower than a maximum total back-driving force applicable to the second driveline by all of the second actuators in combination.

The second backup brake may be configured to produce a maximum second braking force that is lower than a maximum second driving force applicable to the driveline.

The method may comprise applying the first and second backup brakes after an identification of a developing asymmetry condition between the first and second high-lift flight control surfaces.

The method may comprise applying the first and second backup brakes after an identification of an uncommanded movement of the first or second high-lift flight control surfaces.

The method may comprise applying the first and second backup brakes after an identification of a developing unsafe condition associated with the first or second high-lift flight control surfaces.

Embodiments can include combinations of the above features.

In a further aspect, the disclosure describes an aircraft comprising a system as disclosed herein.

Further details of these and other aspects of the subject matter of this application will be apparent from the detailed description included below and the drawings.

DESCRIPTION OF THE DRAWINGS

Reference is now made to the accompanying drawings, in which:

FIG. 3 is flow diagram illustrating a method for actuating one or more high-lift flight control surfaces of the aircraft of FIG. 1.

DETAILED DESCRIPTION

The following disclosure relates to systems and methods for actuating high-lift flight control surfaces such as leading edge slats and trailing edge flaps of aircraft. In some embodiments, the systems and methods disclosed herein can make use of a backup brake that has a lower capacity, size and hence lower weight compared to backup (e.g., asymmetry) brakes used on other actuation systems. In some embodiments, the system disclosed herein can include one or more backup brakes (e.g., per wing) in combination with actuators that are each associated with a no-back device (i.e., irreversible actuators). In comparison with an actuation system including reversible actuators and a larger backup brake configured to counteract a back-driving force that is potentially exerted via all of the reversible actuators in the event of a single failure, the use of irreversible actuators allows for the use of a backup brake of smaller capacity that is configured to counteract a back-driving force applicable via fewer than all of the irreversible actuators (e.g., via only one irreversible actuator experiencing a malfunction). This is due at least in part to the non-failed no-back devices counteracting the back-driving forces exerted through their respective actuators.

The use of a backup brake in combination with irreversible actuators can also improve safety of the actuation system by providing some redundancy to the failure (e.g., asymmetry) protection capability of the actuation system compared to an actuation system having only irreversible actuators and no backup brakes, or compared to an actuation system having reversible actuators and a large backup brake. In some situations, the presence of a backup brake in combination with irreversible actuators could result in an increase in the required integrity check intervals of the no-back devices of the irreversible actuators compared to an actuation system having only irreversible actuators and no backup brakes.

Aspects of various embodiments are described through reference to the drawings.

Figure 1:
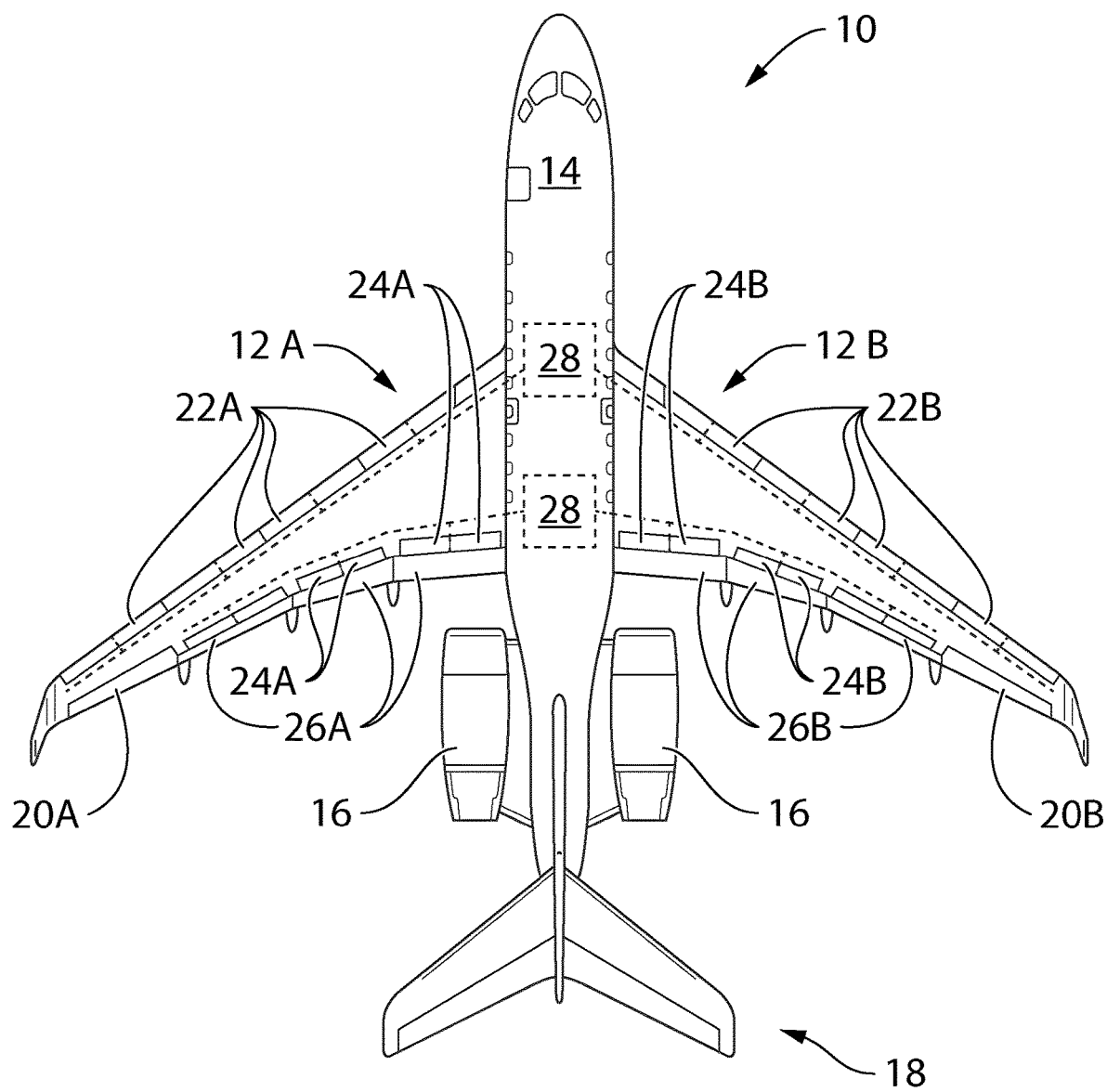
FIG. 1 is a top plan view of an exemplary aircraft comprising a system for actuating one or more high-lift flight control surfaces as disclosed herein.

FIG. 1 is a top plan view of an exemplary aircraft 10 which may comprise a system for actuating high-lift flight control surfaces as disclosed herein. Aircraft 10 may be any type of aircraft such as corporate (e.g., business jet), private, commercial and passenger aircraft suitable for civil aviation. For example, aircraft 10 may be a narrow-body, twin-engine jet airliner or may be an ultra-long range business jet. Aircraft 10 may be a fixed-wing aircraft.

Aircraft 10 may comprise wings 12A, 12B, fuselage 14, one or more engines 16 and empennage 18. One or more of engines 16 may be mounted to fuselage 14. Alternatively, or in addition, one or more of engines 16 may be mounted to wings 12A, 12B. Wings 12A, 12B may each include one or more flight control surfaces such as aileron(s) 20A, 20B, leading edge slat(s) 22A, 22B (or other leading edge devices), spoiler(s) 24A, 24B and trailing edge flap(s) 26A, 26B. Leading edge slats 22A, 22B and trailing edge flaps 26A, 26B may be considered "high-lift" flight control surfaces that may be deployed to increase the amount of lift generated by wings 12A, 12B during landing, take-off and/or during any other appropriate phase(s) of flight or conditions requiring increased lift. Flight control surfaces mounted to or otherwise associated with a port side (i.e., left) wing 12A are referenced herein with a reference character having the suffix "A" and flight control surfaces mounted to or otherwise associated with a starboard side (i.e., right) wing 12B are referenced herein with a reference character having the suffix "B".

Aircraft 10 may comprise one or more systems 28 for actuating one or more of high-lift flight control surfaces such as slats 22A, 22B and/or flaps 26A, 26B. FIG. 1 schematically shows two instances of system 28 superimposed on aircraft 10 where one system 28 is associated with flaps 26A, 26B and the other system 28 is associated with slats 22A, 22B. However, it is understood that various embodiments of aircraft 10 could have both or only one of the two systems 28.

Figure 2:
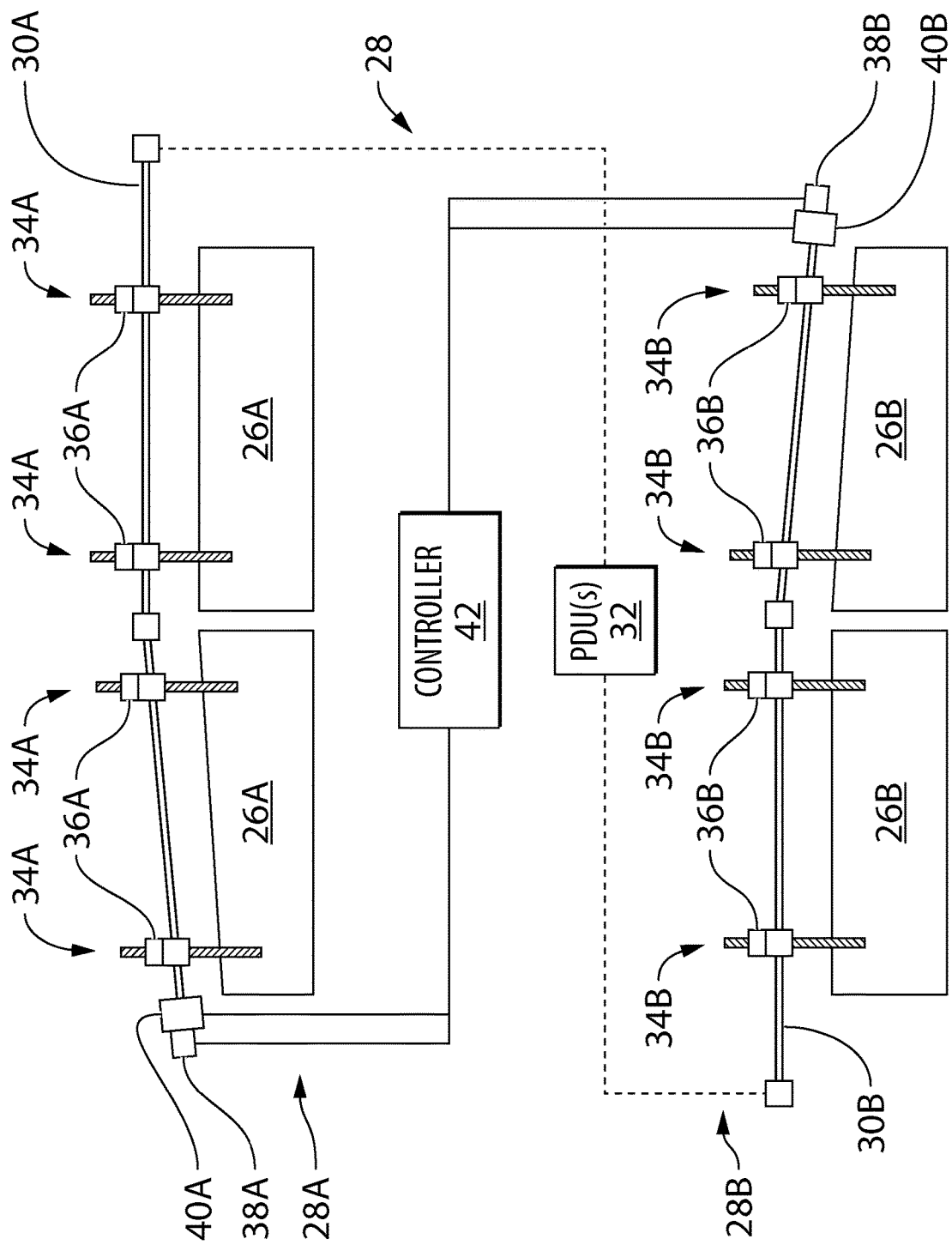
FIG. 2 is a schematic view of an exemplary system for actuating one or more high-lift flight control surfaces of the aircraft of FIG. 1.

FIG. 2 is a schematic representation of an exemplary system 28 for actuating one or more flaps 26A, 26B of aircraft 10. Even though the following description and FIG. 2 refer specifically to flaps 26A, 26B, it is understood that aspects of system 28 described herein are also applicable to the actuation of other types of high-lift flight control surfaces of aircraft 10 such as slats 22A, 22B for example. System 28 may comprise first portion 28A associated with flaps 26A of wing 12A, and second portion 28B associated with flaps 26B of wing 12B.

In various embodiments, system 28 may comprise first driveline 30A for receiving a driving force (e.g., rotary force, torque) from one or more power drive units 32 (referred hereinafter as "PDU(s) 32"). System 28 may comprise a plurality of actuators 34A operatively coupled between first driveline 30A and one or more flaps 26A associated with wing 12A of aircraft 10. Actuators 34A may be configured to cause actuation of the one or more flaps 26A in response to the driving force (e.g., torque) received at first driveline 30A. Each actuator 34A may be associated with a respective suitable no-back device 36A configured to prevent an air load on the one or more flaps 26A from (e.g., back-) driving the one or more flaps 26A. Driveline 30A may be a common driveline configured to drive all of actuators 34A for the purpose of deploying and retracting flaps 26A (e.g., by way of different directions of rotation of one or more torque tubes (or equivalents) of driveline 30A).

System 28 may also comprise second driveline 30B for receiving a driving force (e.g., rotary force, torque) from the same or other PDU(s) 32. System 28 may comprise a plurality of actuators 34B operatively coupled between second driveline 30B and one or more flaps 26B associated with wing 12B of aircraft 10. Actuators 34B may be configured to cause actuation of the one or more flaps 26B in response to the driving force (e.g., torque) received at second driveline 30B. Each actuator 34B may be associated with a respective suitable no-back device 36B configured to prevent an air load on the one or more flaps 26B from (e.g., back-) driving the one or more flaps 26B. Driveline 30B may be a common driveline configured to drive all of actuators 34B for the purpose of deploying and retracting flaps 26B (e.g., by way of different directions of rotation of one or more torque tubes of driveline 30B).

Actuators 34A, 34B may each comprise a (e.g., ball or ACME) screw type of actuator or any other type of actuator suitable for actuating or transmitting an actuation force from respective drivelines 30A, 30B to respective flaps 26A, 26B. Actuators 34A, 34B may be configured to convert a rotary input motion from respective drivelines 30A, 30B to (e.g., linear or rotary) output motion for actuating respective flaps 26A, 26B. PDU(s) 32 may comprise one or more sources of motive power for driving both drivelines 30A, 30B in unison (or differentially in some arrangements). In various embodiments, PDU(s) 32 may comprise an electric motor or a hydraulic motor drivingly coupled to drivelines 30A, 30B for example. Each driveline 30A, 30B may comprise one or more torque tubes extending along each wing 12A, 12B. For example, each driveline 30A, 30B may comprise a plurality of torque tubes in torque-transmitting engagement with PDU(s) 32 and with each other so as to extend to each respective group of actuators 34A, 34B. During normal operation of system 28, drivelines 30A, 30B may be driven by PDU(s) 32 in unison so that the deployment and retraction of flaps 26A on wing 12A may be synchronous with the deployment and retraction of flaps 26B on wing 12B so as to provide symmetric lift characteristics between wings 12A, 12B.

System 28 may comprise one or more safeguards for protecting system 28 from potential unsafe conditions such as unacceptable asymmetric lift characteristics between wings 12A, 12B caused by a loss in synchronization between flaps 26A of wing 12A and flaps 26B of wing 12B in the event of failure. One safeguard against such asymmetry condition is the use of no-back devices 36A, 36B respectively associated with actuators 34A, 34B. In some embodiments, no-back devices 36A, 36B may be integrated with (i.e., be part of) each respective actuator 34A, 34B. In some embodiments, all of actuators 34A, 34B respectively coupled to first driveline 30A and second driveline 30B may be equipped or otherwise associated with respective no-back devices 36A, 36B. No-back devices 36A, 36B may prevent the air loads acting on flaps 26A, 26B from driving flaps 26A, 26B in an uncommanded direction by holding each respective actuator 34A, 34B in its current position. No-back devices 36A, 36B may effectively render each actuator 34A, 34B irreversible. Accordingly, such no-back devices 36A, 36B may prevent an asymmetry condition from occurring in the event of a torque tube failure or other failure of drivelines 30A, 30B. Another failure condition could be an internal failure of PDU(s) 32 leaving the drivelines 30A, 30B not connected to the drive motor(s) of PDU(s) 32 so that air loads may back-drive the entire system 28 symmetrically, unless a safeguard is provided. In various embodiments, no-back devices 36A, 36B may be unidirectional or bidirectional devices. In some embodiments, no-back devices 34A, 34B may be of various types such as ratchet type no-back, wrap-spring no-back or other no-back device(s) suitable for rotary or other types of actuators.

In addition to no-back devices 36A, 36B, system 28 may comprise one or more other safeguards for protecting system 28 from unsafe conditions. For example, system 28 may comprise one or more sensors 38A configured to sense a parameter (e.g., position or speed) associated with flaps 26A on wing 12A, and one or more sensors 38B configured to sense a parameter (e.g., position or speed) associated with flaps 26B on wing 12B. In some embodiments, sensors 38A, 38B may each comprise a rotary sensor (e.g., resolver or encoder) coupled to a respective driveline 30A, 30B and configured to sense a position or speed of each respective group of flaps 26A, 26B by way of sensing a rotary displacement of (e.g., torque tubes of) drivelines 30A, 30B. Alternatively, sensors 38A, 38B could instead be coupled to measure the positions or speeds of individual flaps 26A, 26B directly instead of measuring the positions or speeds of flaps 26A, 26B via drivelines 30A, 30B. Sensors 38A, 38B may also be used to detect uncommanded movement of flaps 26A, 26B due to an internal failure of PDU(s) 32 for example. Parameters sensed via sensors 38A, 38B may also be used to identify a developing unsafe condition associated with flaps 26A, 26B. In some embodiments, PDU(s) 32 may comprise one or more sensors to indirectly measure the position or speed of flaps 26A, 26B during a non-failed operation of system 28.

System 28 may also comprise selectively applicable backup brakes 40A, 40B configured to lock the entire system 28 when an indication of a developing unsafe condition such as a developing asymmetry condition (also referred as a "skew condition") or uncommanded movement is detected via sensors 38A, 38B. For example, upon the detection of a threshold difference in position between flaps 26A and flaps 26B by comparing measurements from sensors 38A, 38B, one or more backup brakes 40A, 40B may be applied to lock drivelines 30A, 30B and prevent further uncommanded movement of flaps 26A, 26B. Backup brakes 40A, 40B may also be applied in case of detected uncommanded movement resulting from a failure of PDU(s) 32 or other developing unsafe condition. Backup brakes 40A, 40B may be applicable directly or indirectly to drivelines 30A, 30B. In some embodiments, backup brake 40A may be disposed at a position along driveline 30A that is outboard of a majority of actuators 34A relative to a centerline of fuselage 14. For example, backup brake 40A may be disposed at a position along driveline 30A that is outboard of all actuators 34A or at a position between the two most outboard actuators 34A. Similarly backup brake 40B may be disposed at a position along driveline 30B that is outboard of a majority of actuators 34B. For example, backup brake 40B may be disposed at a position along driveline 30B that is outboard of all actuators 34B or at a position between the two most outboard actuators 34B. In some embodiments, backup brakes 40A, 40B may be of a disc type that may be applied by spring, electrical or hydraulic actuation. Backup brakes 40A, 40B may be separate from any other braking device(s) that may be part of PDU(s) 32. In various embodiments, backup brakes 40A, 40B may be referred to as "asymmetry brakes", "driveline brakes" and/or "outboard brakes". Backup brakes 40A, 40B may be configured to counteract one or more driving forces applicable to drivelines 30A, 30B.

System 28 may comprise controller 42. Controller 42 may be operatively coupled to PDU(s) 32 for commanding actuation of flaps 26A, 26B. Controller 42 may also be operatively coupled to other avionics component(s) (not shown) or otherwise configured to receive commands from a pilot of aircraft 10 directly or indirectly, or receive commands from an auto-flight system of aircraft 10. In some embodiments, controller 42 may be dedicated to the actuation of flaps 26A, 26B or may be configured to carry out other tasks as well. In some embodiments, controller 42 may comprise or be integrated with a dedicated high-lift system controller for example. In some embodiments, controller 42 may comprise or be integrated with a flight control computer (FCC) or other controller of a fly-by-wire system of aircraft 10 for example.

Controller 42 may comprise one or more data processors and one or more computer-readable memories storing machine-readable instructions executable by the data processor(s) and configured to cause controller 42 to perform a series of steps so as to implement a computer-implemented process such that instructions, when executed by such data processor(s) or other programmable apparatus, can cause the functions/acts specified in the methods described herein to be executed. Memory(ies) can comprise any storage means (e.g. devices) suitable for retrievably storing machine-readable instructions executable by the data processor(s) of controller 42. In some embodiments, controller 42 may comprise one or more analog controllers or analog circuitry.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) having computer readable program code embodied thereon. The computer program product can, for example, be executed by controller 42 to cause the execution of one or more methods disclosed herein in entirety or in part. It is understood that, based on the present disclosure, one skilled in the relevant arts could readily write computer program code for implementing the methods disclosed herein.

Controller 42 may be operatively coupled to PDU(s) 32 for commanding deployment and retraction of flaps 26A, 26B in unison (or differentially in some arrangements) by controlling the operation of PDU(s) 32 accordingly. Controller 42 may also be operatively coupled to sensors 38A, 38B so that signals indicative of sensed positions or speeds associated with flaps 26A, 26B can be received and processed (e.g., compared) at controller 42 or at some other data processor(s) for the purpose of identifying a developing unsafe condition (e.g., asymmetry condition and/or uncommanded movement). For example, a difference that equals to or exceeds a threshold value between a sensed position from sensor 38A and a sensed position from sensor 38B could be indicative of an imminent undesirable asymmetry condition requiring some mitigating action to be taken. Such threshold value may be predetermined for the specific aircraft 10 and the specific configurations of wings 12A, 12B and of flaps 26A, 26B, either experimentally or by simulation for example. Such indication of asymmetry may be an indication of one or more failures associated with system 28 such as a break of a torque tube of a driveline 30A, 30B combined with a dormant malfunction of a no-back device 36A, 36B for example. Such mitigating action to be taken may include the application of one or more backup brakes 40A, 40B to lock respective drivelines 30A, 30B so that manifestation or worsening of the asymmetry condition may be prevented. Backup brakes 40A, 40B may be applied after the identification of the asymmetry condition determined via sensors 38A, 38B. In some embodiments one or both of the backup brakes 40A, 40B may be applied substantially immediately following the identification of the developing unsafe condition (e.g., asymmetry condition and/or uncommanded movement) due to a failure of PDU(s) 32 for example.

As explained above, backup brake 40A may be configured to compensate for a failure of fewer than all of no-back devices 36A, and backup brake 40B may be configured to compensate for a failure of fewer than all of no-back devices 36B since the non-failed no-back devices 36A, 36B would still be expected to counteract the back-driving forces through their respective actuators 34A, 34B. In some situations for example, it may be sufficient that backup brakes 40A, 40B each be configured to compensate for only one failed no-back device 36A, 36B in order to meet the safety requirements. Accordingly, backup brakes 40A, 40B may be of relatively small size and weight. In some embodiments, backup brakes 40A, 40B may each be configured to counteract a back-driving force applicable to their respective driveline 30A, 30B by no more than one (e.g., the most heavily loaded) actuator 34A, 34B, with its associated no-back inoperative. In some embodiments, backup brakes 40A, 40B may each be configured to produce a maximum braking force that is lower than a maximum total back-driving force applicable to their respective driveline 30A, 30B by all actuators of its respective group of actuators 34A, 34B in combination, with all their associated no-back devices 36A, 36B inoperative. In other words, backup brake 40A may be configured to compensate for the loss of one or some, but not necessarily all of no-back devices 36A. Similarly, backup brake 40B may be configured to compensate for the loss of one or some, but not necessarily all of no-back devices 36B. In some embodiments, backup brakes 40A, 40B may each be configured to produce a maximum braking force lower than a maximum driving force applicable to its respective driveline 30A, 30B by PDU(s) 32.

FIG. 3 is flow diagram illustrating method 100 for actuating one or more high-lift flight control surfaces (e.g., flaps 26A, 26 and/or slats 22A, 22B) of aircraft 10. Method 100 can be performed using system 28 as described above or using another suitable system. Aspects of system 28 disclosed herein can also be applicable to method 100. Method 100 may comprise:

actuating one or more first high-lift flight control surfaces (e.g., flaps 26A) using a plurality of actuators 34A operatively coupled between first driveline 30A and the one or more first high-lift flight control surfaces 26A, each actuator 34A being associated with a no-back device 36A configured to prevent an air load on the one or more first high-lift flight control surfaces 26A from driving the one or more first high-lift flight control surfaces 26 (see block 102); and applying backup brake 40A to first driveline 30A (see block 106).

Method 100 may also comprise:

actuating one or more second high-lift flight control surfaces (e.g., flaps 26B) using a plurality of actuators 34B operatively coupled between second driveline 30B and the one or more second high-lift flight control surfaces 26B, each actuator 34B being associated with a no-back device 36B configured to prevent an air load on the one or more second high-lift flight control surfaces 26B from driving the one or more second high-lift flight control surfaces 26B; and applying backup brake 40B to second driveline 30B.

As explained above, method 100 may optionally comprise selectively applying one or both or backup brakes 40A, 40B after an identification of a developing unsafe condition such as a developing asymmetry condition between the first and second high-lift flight control surfaces 26A, 26B and/or of an uncommanded movement attributed to a failure of PDU(s) 32 for example (see block 104). It is understood that backup brakes 40A, 40B may be applied in other circumstances (e.g., abnormal operation of system 28) and that the identification of the developing asymmetry condition or of the uncommanded movement is not a necessary precursor to the application of backup brakes 40A, 40B.

It is understood that the identification of the developing unsafe condition may comprise the identification of an early sign of a potentially undesirable condition to come. For example, the identification could include the detection of a minor asymmetry condition or the detection of another symptom indicative of a potential developing asymmetry condition. In any case, the identification of the developing unsafe condition and the subsequent application of the backup brakes 40A, 40B may be performed before an excessive manifestation of the unsafe condition in order to maintain safe flying conditions for aircraft 10. In some embodiments, the application of backup brakes 40A, 40B may be accompanied by a deactivation of PDU(s) 32 (e.g., removing power from PDU(s) 32) and also the application of a brake of PDU(s) 32.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for actuating one or more high-lift flight control surfaces of an aircraft, the system comprising:
    a first driveline;
    a plurality of first actuators operatively coupled between the first driveline and one or more first high-lift flight control surfaces associated with a first wing of the aircraft, and configured to cause actuation of the one or more first high-lift flight control surfaces in response to being driven by the first driveline, each first actuator being associated with a respective first no-back device configured to prevent an air load on the one or more first high-lift flight control surfaces from driving the one or more first high-lift flight control surfaces; and
    a first backup brake applicable to the first driveline,
    wherein upon a detection of an unsafe condition, the first backup brake is applied by electrical or hydraulic actuation to counteract a back-driving force applicable to the first driveline by no-more than one of the first actuators associated with an inoperative no-back device, such that the first backup brake compensates a loss of only the one of the first actuators associated with the inoperative no-back device and cannot also compensate a loss of another actuator from the first actuators associated with another inoperative no-back device, when the unsafe condition indicates a loss of a plurality of the first actuators respectively associated with inoperative no-back devices; and
    wherein the first backup brake is configured to produce a first maximum braking force that is lower than a maximum driving force applicable to the first driveline by a power drive unit coupled to the first driveline.

2. The system as defined in claim 1, comprising:
    a second driveline;
    a plurality of second actuators operatively coupled between the second driveline and one or more second high-lift flight control surfaces associated with a second wing of the aircraft, and configured to cause actuation of the one or more second high-lift flight control surfaces in response to being driven by the second driveline, each second actuator being associated with a respective second no-back device configured to prevent an air load on the one or more second high-lift flight control surfaces from driving the one or more second high-lift flight control surfaces; and
    a second backup brake applicable to the second driveline,
    wherein the second backup brake is configured to counteract a back-driving force applicable to the second driveline by no-more than one of the second actuators associated with an inoperative no-back device.

3. The system as defined in claim 2, wherein the second backup brake is configured to produce a maximum second braking force that is lower than a maximum second driving force applicable to the second driveline.

4. The system as defined in claim 2, comprising:
    a first sensor configured to sense a first parameter associated with the one or more first high-lift flight control surfaces;
    a second sensor configured to sense a second parameter associated with the one or more second high-lift flight control surfaces; and a controller operatively coupled to the first and second sensors and to the first and second backup brakes, and configured to:
identify the unsafe condition based on the first and second parameters sensed by the first and second sensors; and
cause an application of one or both of the first and second backup brakes after the identification of the unsafe condition.

5. The system as defined in claim 4, wherein the unsafe condition is an uncommanded movement of the first or second high-lift flight control surfaces.

6. The system as defined in claim 4, wherein the unsafe condition is a developing asymmetry condition between the first and second high-lift flight control surfaces.

7. The system as defined in claim 2, wherein
the first backup brake is disposed outboard of a majority of the first actuators; and
the second backup brake is disposed outboard of a majority of the second actuators.

8. An aircraft comprising the system as defined in claim 1.

9. A method for actuating one or more high-lift flight control surfaces of an aircraft, the method comprising:
actuating one or more first high-lift flight control surfaces using a plurality of first actuators operatively coupled between a first driveline and the one or more first high-lift flight control surfaces, each first actuator being associated with a first no-back device configured to prevent an air load on the one or more first high-lift flight control surfaces from driving the one or more first high-lift flight control surfaces; and
applying a first backup brake to the first driveline,
wherein upon a detection of an unsafe condition, the first backup brake is applied by electrical or hydraulic actuation to counteract a back-driving force applicable to the first driveline by no-more than one of the first actuators associated with an inoperative no-back device, such that the first backup brake compensates a loss of only the one of the first actuators associated with the inoperative no-back device and cannot also compensate a loss of another actuator from the first actuators associated with another inoperative no-back device, when the unsafe condition indicates a loss of a plurality of the first actuators respectively associated with inoperative no-back devices; and
wherein the first backup brake is configured to produce a maximum first braking force that is lower than a maximum first driving force applicable to the first driveline by a power drive unit.

10. The method as defined in claim 9, comprising:
actuating one or more second high-lift flight control surfaces using a plurality of second actuators operatively coupled between a second driveline and the one or more second high-lift flight control surfaces, each second actuator being associated with a second no-back device configured to prevent an air load on the one or more second high-lift flight control surfaces from driving the one or more second high-lift flight control surfaces; and
applying a second backup brake to the second driveline,
wherein the second backup brake is configured to counteract a back-driving force applicable to the second driveline by no-more than one of the second actuators associated with an inoperative no-back device.

11. The method as defined in claim 10, wherein the second backup brake is configured to produce a maximum second braking force that is lower than a maximum second driving force applicable to the second driveline.

12. The method as defined in claim 10, comprising applying the first and second backup brakes after an identification of a developing asymmetry condition between the first and second high-lift flight control surfaces.

13. The method as defined in claim 10, comprising applying the first and second backup brakes after an identification of an uncommanded movement of the first or second high-lift flight control surfaces.

14. The method as defined in claim 10, comprising applying the first and second backup brakes after an identification of the unsafe condition associated with the first or second high-lift flight control surfaces.

* * * * *